(12) United States Patent
Hoang et al.

(10) Patent No.: US 10,985,626 B2
(45) Date of Patent: Apr. 20, 2021

(54) ELECTRIC MACHINE SUPPLIED AT LOW VOLTAGE AND ASSOCIATED MULTICELLULAR POWER TRAIN

(71) Applicant: CENTRE NATIONAL DE LA RECHERCHE SCIENTIFIQUE, Paris (FR)

(72) Inventors: Emmanuel Hoang, Paris (FR); Eric Laboure, Cachan (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 16/486,748

(22) PCT Filed: Feb. 16, 2018

(86) PCT No.: PCT/EP2018/053940
§ 371 (c)(1),
(2) Date: Aug. 16, 2019

(87) PCT Pub. No.: WO2018/149996
PCT Pub. Date: Aug. 23, 2018

(65) Prior Publication Data
US 2019/0363599 A1 Nov. 28, 2019

(30) Foreign Application Priority Data

Feb. 17, 2017 (FR) ...................................... 1751280

(51) Int. Cl.
*H02K 3/28* (2006.01)
*H02K 19/34* (2006.01)

(52) U.S. Cl.
CPC ............... *H02K 3/28* (2013.01); *H02K 19/34* (2013.01); *H02K 2213/12* (2013.01)

(58) Field of Classification Search
CPC ....... H02K 3/28; H02K 19/34; H02K 2213/12
(Continued)

(56) References Cited

U.S. PATENT DOCUMENTS 6,208,058 B1   3/2001 Taji et al.
6,815,920 B2 * 11/2004 Cohen ...................... H02P 5/68
                                                              318/599
(Continued)

FOREIGN PATENT DOCUMENTS

DE   102005032965 A1   3/2007
DE   102013224504 A1   6/2015
(Continued)

OTHER PUBLICATIONS

Search Report issued in French Patent Application No. 1751280 dated Nov. 20, 2017 (references also cited in International Search Report).

(Continued)

*Primary Examiner* — David Luo
(74) *Attorney, Agent, or Firm* — Nixon & Vanderhye (57) ABSTRACT

Disclosed is an electric machine and a traction machine utilizing the electric machine. The electric traction chain includes an electric machine, a plurality of power converters configured to generate AC power signals associated with the various phases of the electric machine, and a plurality of DC power sources. The electric machine includes a rotor and a stator, the stator including at least one winding made from coilings of an insulated conductive material, each winding being associated with one phase of the electric machine, and including a plurality of independently powered coils. Each DC power source of the electric machine is associated with a separate power converter, the coils of a same winding are powered by power signals associated with a same phase generated by the separate power converters.

20 Claims, 8 Drawing Sheets

(58) Field of Classification Search
USPC .................................................. 318/716, 700
See application file for complete search history.

(56) References Cited

U.S. PATENT DOCUMENTS

| | | | | |
|---|---|---|---|---|
| 8,030,868 | B2* | 10/2011 | Yamagishi | B60L 1/003 |
| | | | | 318/400.41 |
| 8,839,503 | B2* | 9/2014 | Yi | H02K 1/148 |
| | | | | 29/596 |
| 9,780,704 | B2* | 10/2017 | Pietromonaco | H02K 11/22 |
| 2017/0047804 | A1 | 2/2017 | Dajaku | |

FOREIGN PATENT DOCUMENTS

| | | |
|---|---|---|
| EP | 2368319 B1 | 3/2013 |
| GB | 2474321 A | 4/2011 |
| WO | 2010/067021 A2 | 6/2010 |

OTHER PUBLICATIONS

Search Report issued in International Patent Application PCT/EP2018/053940 dated May 22, 2018 with English translation provided.

* cited by examiner

ELECTRIC MACHINE SUPPLIED AT LOW VOLTAGE AND ASSOCIATED MULTICELLULAR POWER TRAIN

BACKGROUND OF THE INVENTION

Field of the Invention

The invention is situated within the field of devices for the conversion of electrical energy, or electric machines, and relates in particular to an electric machine designed to be supplied at low voltage.

Description of the Related Art

Electric machines are commonly used in items of industrial equipment and electric power trains. By way of example there may be mentioned electric vehicles, hybrid vehicles, locomotives or ships. The main advantage of electric traction motors, with respect to thermal traction motors, is based on the ease of manufacture thereof. In fact, they are free of parts the design of which is complex, which require very little maintenance and do not give off carbon dioxide.

Figure 1A:
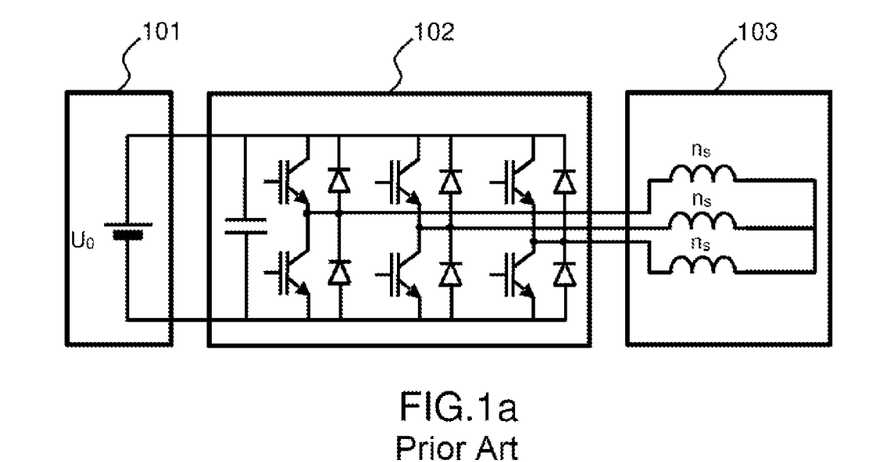
FIGS. 1a, 1b and 1c, already described, show respectively a power train, a power inverter and a multiphase electric machine according to the state of the art prior to the invention.

FIG. 1a shows the structure of a power train according to the state of the art, making it possible to connect a DC voltage supply source to a multiphase electric machine. This structure is the conventional structure, used both for converting electrical energy into mechanical energy (electric motor), or conversely for producing electrical energy from mechanical energy (electric generator). This power train is composed of three main elements: a source of supply 101, of voltage $U_0$, a power inverter 102 and an electric machine 103 comprising windings.

The supply source 101 is a DC voltage source, such as for example a battery, or an AC voltage source rectified in order to convert it to a DC voltage, as is the case for example in the field of railway traction. In the on-board systems, the energy source can be constituted by electrochemical accumulators placed in series, which deliver in a unitary manner a low voltage (of the order of a few volts per accumulator), or by a fuel cell.

The power inverter 102, or voltage inverter, is an electronic circuit making it possible to convert the DC supply voltage delivered by the supply source into several phase-shifted AC supply signals. In the case of a three-phase motor, it delivers three supply signals.

Figure 1B:
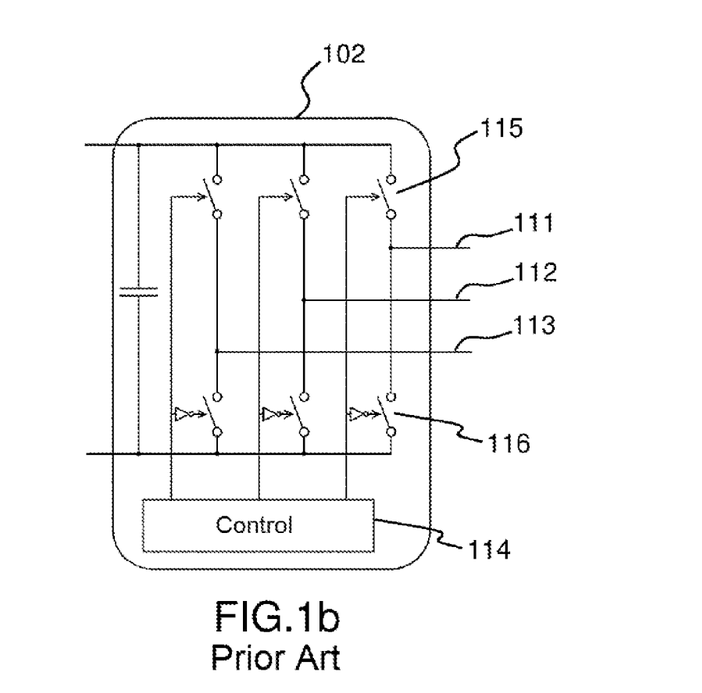

FIG. 1b shows in more detail the elements which compose such a power inverter, known in the state of the art. The inverter 102 operates on the principle of switching mode power supplies. It comprises a control circuit 114 which for each of the signals 111, 112 and 113 delivered, switches two transistors mounted as a bridge arm, such as for example the transistors 115 and 116 for the signal 111. Thus, the delivered signal has a square-wave voltage the value of which is either that of the positive pole of the supply (generally corresponding to a high voltage), or that of the negative pole of the supply (generally ground). Due to the high-frequency switching of the switches, the current of the signal generated in the coils constituting the electric machine which they supply is alternating current. The frequency and the width of the pulses make it possible to control the different parameters of these signals (frequency, amplitude and phase), and thus the speed of rotation and the torque.

The electric machine 103 is the final device of the power train, which drives a rotation shaft or is driven by this shaft, according to whether it is used as a motor or as a generator. It comprises several phases, generally three, i.e. it is supplied by several currents uniformly phase-shifted (in the case of a three-phase motor, the three currents of the phases are respectively shifted by 120°).

Figure 1C:
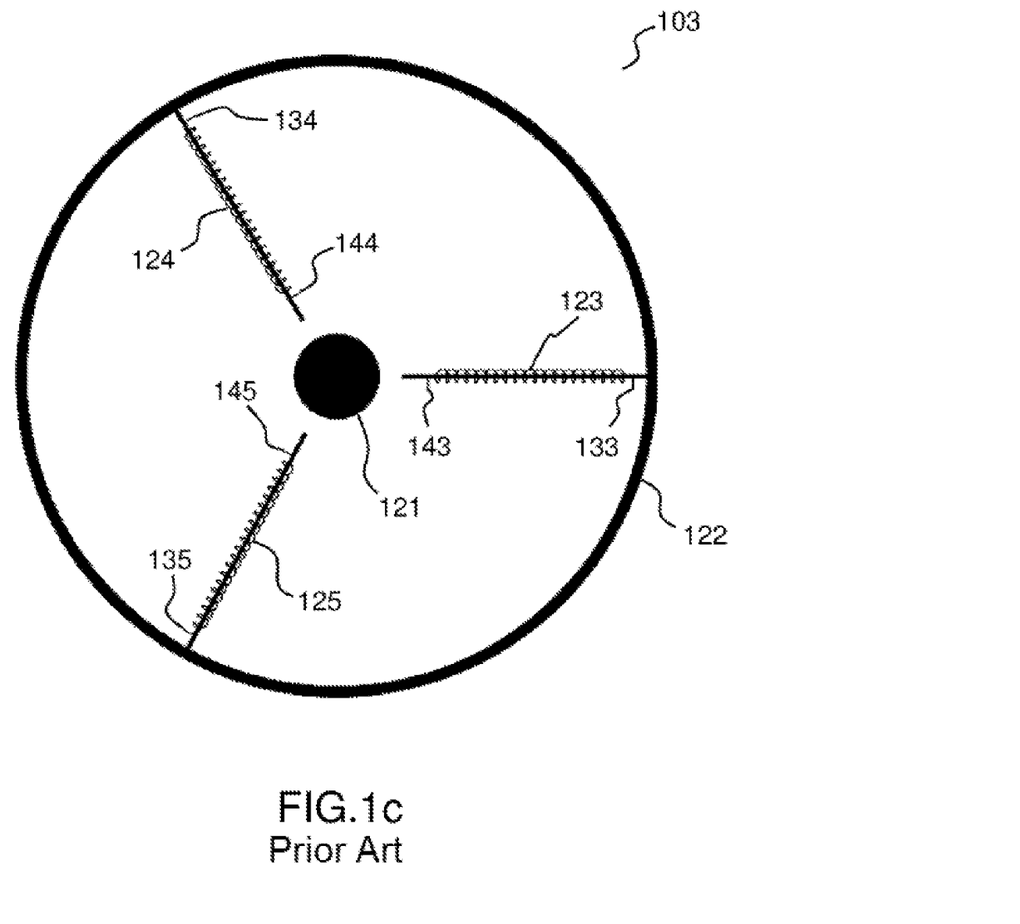

FIG. 1c shows a multiphase electric machine according to the state of the art. It comprises a rotor 121, on which is fixed the shaft driven in rotation, and a stator 122, a cylindrical part made from a stack of mild iron sheets or of ferromagnetic material, containing several electric coilings, or windings 123, 124 and 125. Each winding is constituted by a large number of turns of conductive wire, most often copper, covered with an insulating varnish, forming coilings housed in the slots of the stator. The windings can be produced from a single coil, several coils placed in series, or coils the ends of which are connected to one another and supplied by one and the same signal, and are thus mechanically and electrically in parallel. A winding thus has a single pair of terminals (an input and an output). In the figure, these are respectively the terminals 133 and 143 for the first winding, the terminals 134 and 144 for the second, and the terminals 135 and 145 for the third.

The windings are supplied by an alternating current produced by the power inverter and associated with one of the phases of the electric machine. Each winding generates its own magnetic field. The variations over time in the supply current of the windings causes a variation over time of the level of each of the magnetic fields generated. The phase shift applied to the supply voltage of the windings thus leads to a variation over time in the direction of the total magnetic field produced, which drives the rotor in rotation.

In the example in FIG. 1c, the electric machine is three-phase, i.e. the windings are supplied by three phase-shifted supply currents. The electric machine thus comprises three windings, but it is possible to increase the number of windings by associating several windings with one and the same phase, or by modifying the number of phases.

The battery, power inverter and electric machine assembly has been known for many years. However, its applications are evolving, as well as expectations in terms of the levels of power and efficiencies. This is the case in particular for electric vehicles, where the power delivered determines the performance of the vehicle in terms of acceleration and maximum speed, the efficiencies determine the performance in terms of distance that can be covered, and where the bulk and the weight of the power train are dimensioning elements. The ability of the power train to meet all of these requirements poses a large number of problems due to the magnitude of the power developed.

With respect to the batteries, they are the result of placing in series a large number of single accumulators delivering low voltages, so as to obtain a supply voltage that is capable of reaching several hundreds of volts. The problem then arises of balancing the accumulators, as the voltage at the terminals of each element of which the battery is composed may vary according to the temperature, ageing thereof etc. With respect to elements placed in series, a voltage difference at the terminals of one of the accumulators can be compensated by an opposite difference on another element, making these differences invisible for a battery health monitor only monitoring the total voltage. In order to avoid any risk of the elements being destroyed, a complex balancing of the voltages delivered by each of the accumulators is thus required for several technological families of accumulators (BMS "battery management system"). These management systems are not suitable when the delivered powers are too important. Another drawback of the batteries is that the failure of a single accumulator has the effect of making the battery, and therefore all of the power train, unserviceable.

Finally, handling a high-voltage battery presents risks and requires particular precautions, which is not the case for low-voltage batteries (the current regulations define "low voltage" as the contact voltage above which it is necessary to provide protection systems, i.e. 60 volts direct current). For the same power, reducing the supply voltage of the battery of a power train can be carried out by increasing the amperage of the current. The problem then arises of producing the power electronics and coils of the electric machine, the complexity and the size of which will increase with the intensity of the current. The choice of the voltage delivered by the batteries for supplying an electric power train is thus the result of a compromise between on the one hand the capacity to deliver high currents, and on the other hand the compactness of the power train, the complexity of its implementation and the protection of the users.

With respect to the power inverter, or voltage inverter, the dimensioning of the transistors that it comprises depends on the voltages and amperages of the switched currents. Thus, the insulated-gate bipolar transistors (or IGBT transistors) mounted as a bridge are generally associated with high voltages, while other types of transistors, such as MOSFET transistors (acronym for metal oxide semiconductor field effect transistor) are generally associated with low voltages. The latter have shorter switching times than IGBTs, which has a positive impact on the switching losses, but the conduction losses thereof increase with the voltage. This is why IGBT transistors are most often used for power inverters, the size of these transistors increasing with the switched voltages.

With respect to the electric machine, although the amperage of the current in the windings is quasi-sinusoidal, the voltage is square-wave, alternating maximum voltage and zero voltage. When the supply power values are high, the square-wave voltages at the terminals of the coils have very significant rising and falling edges. During the period of the rising and falling edges, the distribution of the voltage between the turns which compose the windings of the electric machine do not take place in a uniform manner, in particular due to a parasitic capacitances phenomenon. The turns situated at the ends of the coil thus absorb very significant voltage levels which may lead to breakdowns of the insulators, which has the effect of making the electric machine unserviceable.

For the reasons mentioned above, there is thus a need for a permanent solution making it possible to reduce the voltage of the supply currents in an electric power train, which would resolve among other things:
  the problem of the danger of handling the supply source,
  the problem of the bulk of the power inverters, and
  the problem of the premature ageing of the electric machine,
without detriment to the efficiency of the elements of the power train, or to the power that it delivers.

In order to limit the amperage of the currents used, European patent EP 2 368 319 B1 proposes dividing the electric machine into two coupled electric sub-machines. The power train is then broken down into two sub-power trains each comprising a supply source in order to supply a power inverter delivering alternating signals to the phases of three windings positioned as a star structure in the electric machine. In doing so, the voltage and the amperage of the currents are divided by two. However, this method is not compatible with all electric machines as the number of windings that it must comprise is directly proportional to the number of sub-power trains: producing a three-phase motor by dividing the voltages and amperages of the current by two requires exactly six coils in the electric machine. Reducing the voltages and the amperages of the currents used is thus linked to the number of windings of the electric machine, and producing a high-power power train supplied at low voltage can only be carried out for electric machines comprising a very large number of windings (a 580 V electric machine would require an electric machine with 36 windings supplied at low voltage).

Moreover, such a device generates interference, which patent EP 2 368 319 B1 proposes to reduce by using magnetic couplers between the phases, which has the effect of increasing the volume of the power train and the complexity of the implementation thereof.

BRIEF SUMMARY OF THE INVENTION

Thus, a subject of the invention is an electric machine, and the associated power train capable of being supplied at low voltages without this requiring fundamental modifications to the electric machine. This result is obtained by dividing the windings which compose the electric machine and supplying them independently.

To this end, the invention describes an electric machine, of the type comprising a rotor and a stator, the stator containing at least one winding made from coilings of insulated conductive material, each winding being associated with a phase of the electric machine. The electric machine according to the invention is characterized in that each winding comprises a plurality of coils supplied independently.

According to an embodiment, the coils of one and the same winding are associated with one and the same phase of the electric machine.

Advantageously, the coils of one and the same winding have a substantially equivalent number of turns.

Advantageously, the windings of the electric machine all comprise one and the same number of coils supplied independently.

According to an embodiment of the invention, the coils which constitute the windings of the electric machine are composed of a single U-shaped conductive element, the ends of which are mechanically and electrically connected to a printed circuit board by means of which they are supplied.

The invention also describes an electric power train comprising an electric machine according to one of the embodiments mentioned above, a plurality of power inverters configured in order to generate AC supply signals associated with the different phases of the electric machine, and a plurality of DC supply sources.

In the electric machine according to the invention, each DC supply source is associated with a distinct power inverter, the coils of one and the same winding being supplied by supply signals associated with one and the same phase generated by distinct power inverters.

Advantageously, in the power train according to the invention, since the coils which constitute the electric machine are supplied by a printed circuit board to which they are mechanically and electrically connected, the power inverters are produced on said electric circuit.

In the power train according to the invention, in the case of supply voltages that reach acceptable values, the power inverters are advantageously produced from transistors of the MOSFET or GaN FET type.

These power inverters can advantageously be connected to a common electrical potential.

According to an embodiment of the invention, the dividing of the windings of the electric machine into independent coils is such that the supply sources of the electric machine deliver a low-voltage signal, i.e. a signal less than 60 Volts DC (direct current).

Advantageously, the power inverters of the power train according to the invention are capable of turning off the supply of the coils of the electric machine as a function of a required power, which makes it possible to obtain the optimum efficiency from the power train regardless of the power demand.

BRIEF DESCRIPTION OF THE DRAWINGS

The invention will be better understood and other characteristics and advantages will become more apparent on reading the following description, given by way of non-limitative example, and from the attached drawings, in which.

DETAILED DESCRIPTION OF THE PREFERRED EMBODIMENTS

In the following description, the term "electric machine" is used in order to designate an electric machine properly so called, converting electrical energy into mechanical energy (motive power), but also its inverse (generator). The invention is shown in the following figures in the form of a multiphase electric machine comprising three branches but applies in a similar manner regardless of the number of branches. It also applies in the context of single-phase electric machines, constituted by one or more branches connected to one and the same phase. The electric machine can equally well be of the synchronous (variable reluctance or permanent magnets, or also mixed) or asynchronous type.

Figure 2:
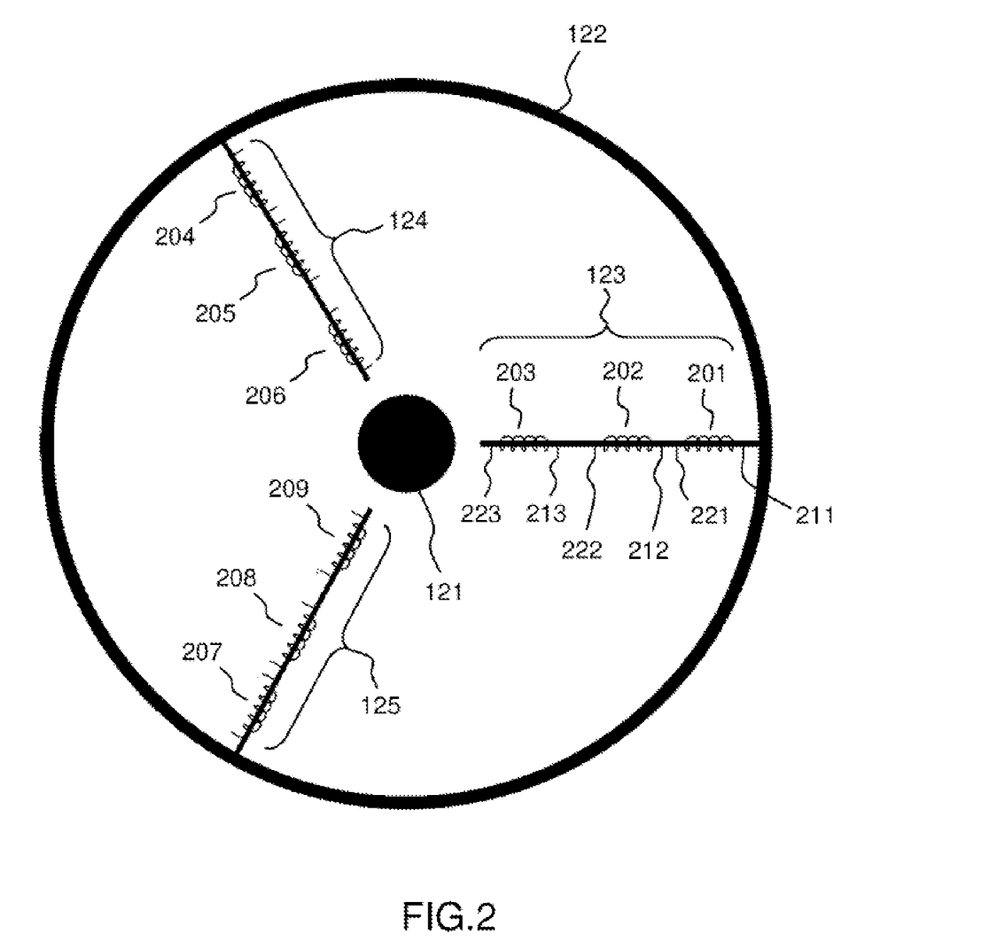
FIG. 2 shows an electric machine according to an embodiment of the invention.

FIG. 2 shows an electric machine according to an embodiment of the invention. This electric machine is similar to an electric machine according to the state of the art in that it is constituted by a rotor 121, and a stator 122 comprising windings (123, 124 and 125) connected to different phases, but is differentiated therefrom in that the windings are divided into a plurality of coils (201, 202, 203, 204, 205, 206, 207, 208, 209) each having a number of turns less than the total number of turns of the coiling. Each coil of one and the same winding has its own terminals (211 and 221, 212 and 222, 213 and 223) via which it is supplied.

The invention thus proposes to divide each of the windings into a number $k_B$ of coils of smaller size, or partial coils. In the example in FIG. 2, each winding has been divided into three partial coils having a substantially identical number of turns. So as to have a number of turns equivalent to that produced by a winding of $N_S$ turns, each of the coils comprises $N_S/k_B$ turns. The partial coils belonging to one and the same winding are associated with one and the same phase of the electric machine. The invention thus makes it possible to divide each phase into $k_B$ magnetically coupled sub-phases (the field lines generated by partial coils of one and the same winding are oriented in the same direction), and thus constitute $k_B$ multiphase electric sub-machines (in FIG. 2, the electric sub-machines are constituted respectively by the partial coils [201, 204, 207], [202, 205, 208], and [203, 206, 209]).

In the example shown in FIG. 2, the partial coils constituting one and the same winding (for example the partial coils 201, 202 and 203) are placed one after another, but they could also be interlinked, mixed or superposed, without detriment to the invention.

By producing each of the windings from partial coils of sizes smaller than that of the complete winding, the invention makes it possible, for a supply voltage per turn identical to that of the state of the art, to supply each of the partial coils with a reduced voltage in proportion to the number $k_B$ of sub-coils. This dividing thus amounts to positioning banks of turns in parallel rather than in series, in order to be able to supply them with distinct supply signals having lower voltages. The coils of one and the same winding are thus mechanically (but not electrically) in parallel in one and the same winding. By being supplied by signals of one and the same phase, the magnetic fields that they generate build up. The power delivered by the electric machine is thus equivalent to that delivered by the electric machines according to the state of the art.

By adapting the number $k_B$ of partial coils per winding, it is possible to supply the windings of the electric machine at low voltages.

For $k_B=1$, the electric machine is in every way identical to an electric machine according to the state of the art.

When $k_B$ increases, the supply voltage of each of the partial coils reduces accordingly.

For $k_B=N_S$, the electric machine according to the invention has $N_S$ partial coils produced from a single turn.

Figure 3A:
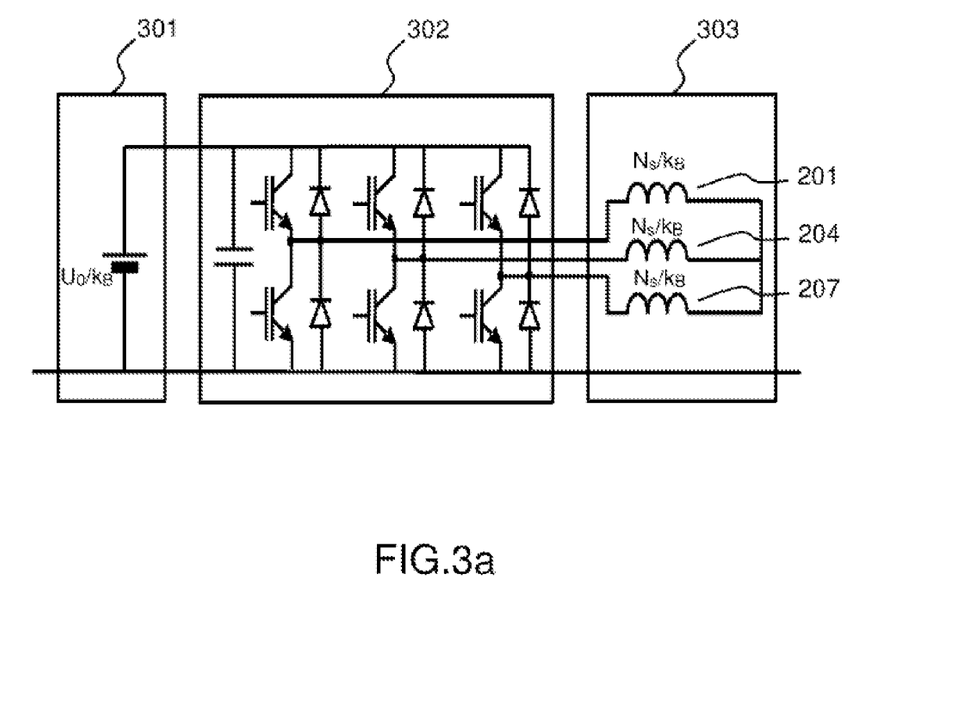
FIGS. 3a and 3b show the different elements necessary for supplying the coils of an electric machine according to embodiments of the invention.

FIG. 3a shows the different elements required for supplying partial coils constituting the windings of an electric machine 303 according to an embodiment of the invention. The sub-power train shown is dedicated to supplying not one of the windings of the electric machine, but a sub-assembly of these windings, such as for example the partial coils 201, 204 and 207 in FIG. 2, which are associated with distinct phases. The DC voltage source 301 supplying the power inverter is a direct or rectified voltage source delivering a voltage $U_0/k_B$, with $U_0$ the voltage delivered by the supply source in a power train according to the state of the art (cf. FIG. 1a).

The power inverter 302 is similar to a power inverter of the state of the art, except that it converts a signal the voltage of which is reduced in proportion to $k_B$ with respect to an on-board power inverter in a standard power train for one and the same power delivered by the electric machine.

Figure 3B:
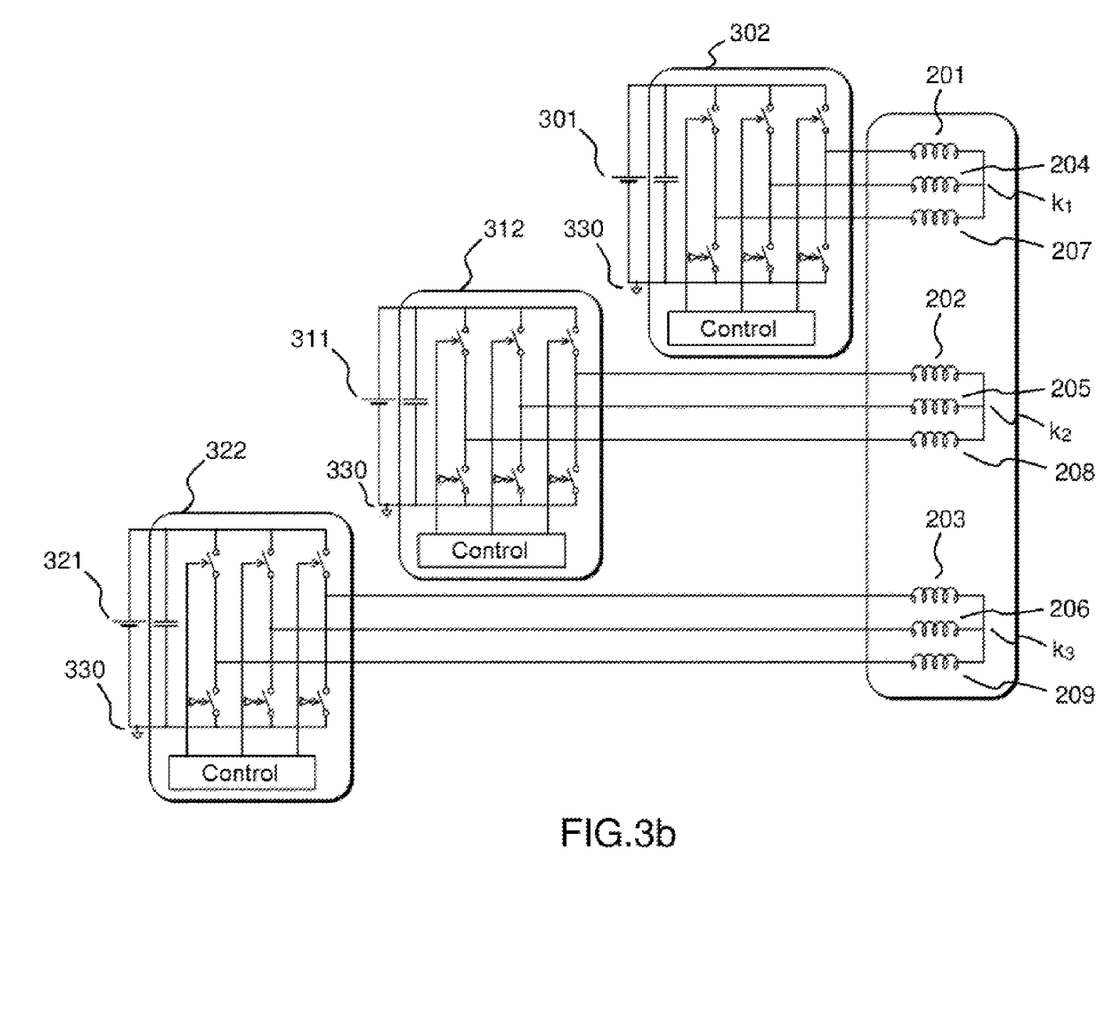

The invention requires utilization, in parallel, of a plurality of sub-power trains such as that shown in FIG. 3a. FIG. 3b shows a complete power train according to the invention, in the case where the number $k_B$ of coils used in order to subdivide the windings of the electric machine is three for a three-phase electric machine. The invention applies in a completely identical manner, by adjusting the number of items of equipment, to all integer values of $k_B$ greater than one, when the number of phases of the electric motor is different to three.

In FIG. 3b, the windings of the multiphase electric machine are divided into three partial coils associated with one and the same phase. With reference to FIG. 2a, the partial coils 201, 202 and 203 are associated with the first phase, the partial coils 204, 205 and 206 are associated with the second phase, and the partial coils 207, 208 and 209 are associated with the third phase.

The partial coils 201, 204 and 207, the number of turns of which is $N_S/k_B$, are supplied by a first power inverter 302, itself supplied by a first supply 301 delivering a voltage $U_0/k_B$.

Similarly, the partial coils 202, 205 and 208 are supplied by a second power inverter 312, supplied by a second supply 311 delivering a voltage $U_0/k_B$.

Finally, the partial coils 203, 206 and 209 are supplied by a third power inverter 322, supplied by a third supply 321.

Advantageously, the different voltage inverters are connected to a common electrical reference potential 330, such as ground.

The power train according to the invention thus results in the different items of equipment of which it is composed being placed in parallel, which has the effect of allowing each of its elements to operate at lower voltage levels than the power trains of the state of the art.

Theoretically, it therefore consumes as much energy as a power train according to the prior art and offers the same power level. However, this placing of the items of equipment in parallel has various advantages.

Advantages Associated with the Invention Relating to the Electric Machine

With respect to the electric machine, the magnetic structure of the electric machine, i.e. its shape, its bulk, the number of coils, the number of turns per coil, the structure of the plates etc. is not modified with respect to the known electric machines. The only modification necessary in order to implement the invention in an existing electric machine consists of replacing each winding with a plurality of partial coils of smaller sizes, the terminals of which are connected to a distinct supply. Replacing the windings with a plurality of partial coils is done at constant volume. Implementing the invention in an existing electric machine is thus limited to the modification of the winding.

In the electric machines according to the state of the art, the steepness of the fronts of the voltage causes problems of parasitic capacitances between the turns. The result is a non-uniform distribution of the current in the turns of the coil, in particular at the fronts of the voltage pulses. The electric machine according to the invention receives a low supply voltage for each of the coils constituting one and the same winding. For this reason, the level of the fronts of the voltage pulses which operate during the switching of the transistors of the power inverter is reduced. The risk of breakdown of the insulators of the turns is thus reduced in proportion to the reduction of the voltage, which in turn reduces the premature ageing of the electric machine. It is possible to take this reduction of voltage into account in order to reduce the thickness of the insulator protecting the copper conductors, and thus to reduce the surface area occupied by the coils or increase the number of turns. The parasitic capacitive currents caused are themselves also reduced, which has the effect of reducing the electromagnetic interference caused and makes it possible to reduce the means to be implemented in order to respect the rules of electromagnetic compatibility.

Reducing the parasitic capacitive currents generated is even more important when the different voltage inverters are connected to a common electrical potential.

Advantages Associated with the Invention Relating to the Power Inverters

With respect to the power inverters, the invention makes it possible to use not a single, high-power inverter, but a plurality of medium- or low-voltage inverters of lower power.

The volume occupied by each of the elements which make up the inverter, and in particular that occupied by the transistors, is a function of the switched currents and voltages. By reducing the voltage of the phases, the size of the components used decreases.

Thus, the volume occupied by a high-power inverter or several inverters of lower power is theoretically equivalent. However, using a plurality of inverters of medium or low power in parallel has several advantages. One of the advantages associated with the dividing of the energy conversion function is based on the possibility of being able to distribute the implementation of the electronics as close as possible to the electric machine. The different inverters can be distributed in modules of small size, configured geometrically in very precise shapes, integrated as close as possible to the coils. This makes it possible to shorten the connections between the inverters and the electric machine, which has the effect of reducing electromagnetic interference and losses. The electric machine and the power inverter are thus no longer two entities designed independently of one another, but a single entity produced so as to optimize the interactions between the inverters and the electric machine. The use of a single high-power inverter also poses the problem of heat management. The use of several lower-voltage inverters in parallel causes less heating, and the dividing thereof into independent modules improves the dissipation of the heat produced.

Figure 4A:
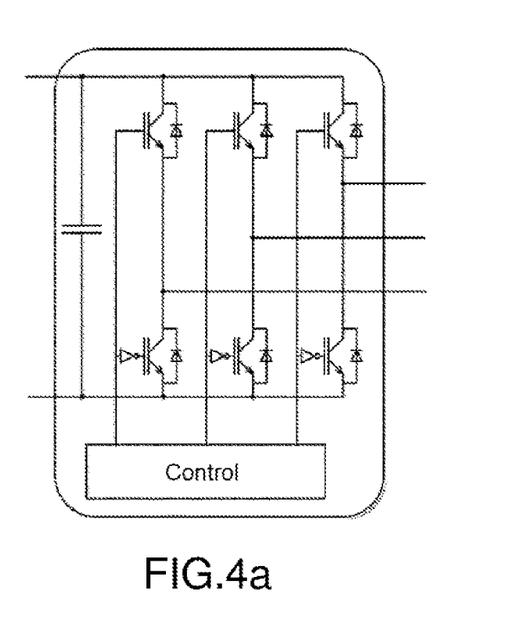
FIGS. 4a and 4b show different embodiments of power inverters able to be used in order to implement the invention, FIG. 5 gives an example of efficiencies that can be obtained as a function of the power required for a power train according to the invention.
Figure 4B:
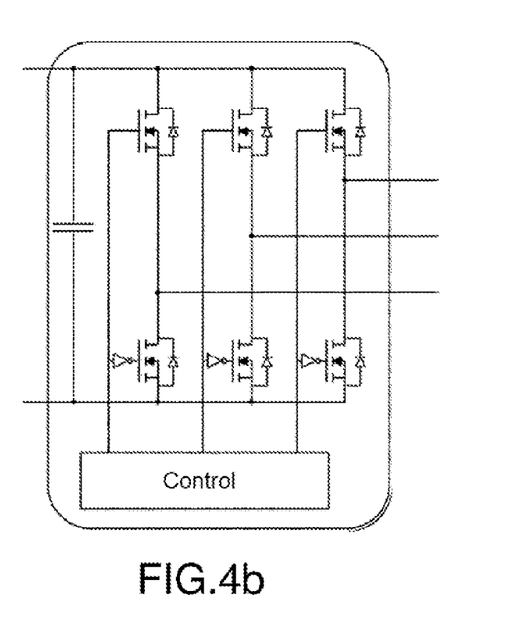

Power inverters switching high voltages are generally produced based on IGBT transistors, which have less conduction losses than MOSFET transistors of the same voltage rating, but are not optimal in terms of switching losses. FIG. 4b shows a power inverter produced from IGBT transistors. In order to optimize the efficiencies of these inverters, it is known to reduce the switching frequencies, which affects the quality of the shape of the currents produced in order to supply the phases of the electric machine. The efficiency obtained is thus the result of a compromise between operating frequency and switching losses.

The invention makes it possible to reduce the switched voltage levels. When they are sufficiently low (typically less than 200 Volts), it is then possible to change the family of transistors, and to use for example MOSFET transistors. FIG. 4b shows a power inverter produced based on MOSFET transistors. These transistors are bidirectional, and do not always need the use of diodes. MOSFET transistors have switching times, and therefore switching losses, smaller than IGBT transistors of the same voltage rating. They can thus be used at very high frequencies, which improves the quality (the shape) of the currents delivered.

By dividing the power inverter, each element is thus more compact and can achieve high efficiencies using technologies suitable for the powers that are switched. By further increasing the dividing of the windings and inverters, it is possible to use transistors which are not normally used in high-power electronics but in low-power electronics. Among them wide bandgap semiconductor transistors, such as for example GaN FET transistors (gallium nitrite field effect transistor) which have very good efficiencies and very short switching times.

Advantages Associated with the Invention Relating to the Power Supplies

With respect to the power supplies, the invention makes it possible to use batteries of medium or even low voltage in parallel, rather than using a single high-voltage battery. The invention is compatible with existing power trains, the accumulators simply needing to be connected in groups and used in parallel rather than in series. If the total voltage delivered is equivalent to that of the state of the art, the parallelization of the power supplies allows, when the voltage of each battery is reduced to below 60 volts, handling of items of equipment without requiring particular precautions.

Another advantage of this parallelization of the supply sources resides in the fact that the balancing of low-voltage batteries is easier to carry out than that of high-voltage batteries. In addition, these batteries are compatible with battery management systems (BMS), making it possible to monitor the state thereof and to optimize the use thereof, well understood in industry, which is not the case for high-voltage batteries, where these monitoring systems become very complex. Linking different power inverters to a common electrical potential also has the effect of facilitating the implementation of a management electronics of the BMS type.

Finally, using batteries in parallel means that when one of them is faulty, the power train loses power but remains operational, the other batteries supplying the respective coils thereof, which makes it possible for the electric machine to continue to operate. It is also possible to adjust the current which passes through each of the batteries, so that, when one of them operates in a degraded way, it only produces a portion of the nominal current, the other batteries compensating for this reduction of the power delivered. It is thus possible to adjust the loads supplied by the batteries, and thus manage the ageing thereof.

Advantages Associated with the Invention Relating to the Power Train Assembly

The invention also makes it possible to improve the overall efficiency over the whole of the power train, by making it possible to turn off certain coils as a function of the power required.

In fact, due to the structure thereof, the current power trains invariably supply the electric machine with the maximum voltage. When the need for power is high, such as for example when starting an electric vehicle, the efficiency of the power train is very good. But when the need for power reduces, such as for example when the electric vehicle runs at a steady state, the voltage pulses generated by the inverter have very short durations, but always at the maximum voltage. The irreducible losses associated with these significant voltage variations in the inverter and the machine degrade the efficiency of the power train at a low level of power. At low speed, the efficiency obtained by the power trains according to the state of the art is thus sub-optimum, which is unfortunate, especially as a large part of the time, electric vehicles operate at low power levels during urban cycles or long-distance cycles.

The invention makes it possible to use only certain coils, by turning off a portion of the power inverters. For this reason, it is possible to only supply the equivalent of a portion of the winding. By doing this, the batteries are protected from ageing, and the components are under less stress, but above all the efficiency of the power train is optimum over all the operating range of the system.

Figure 5:
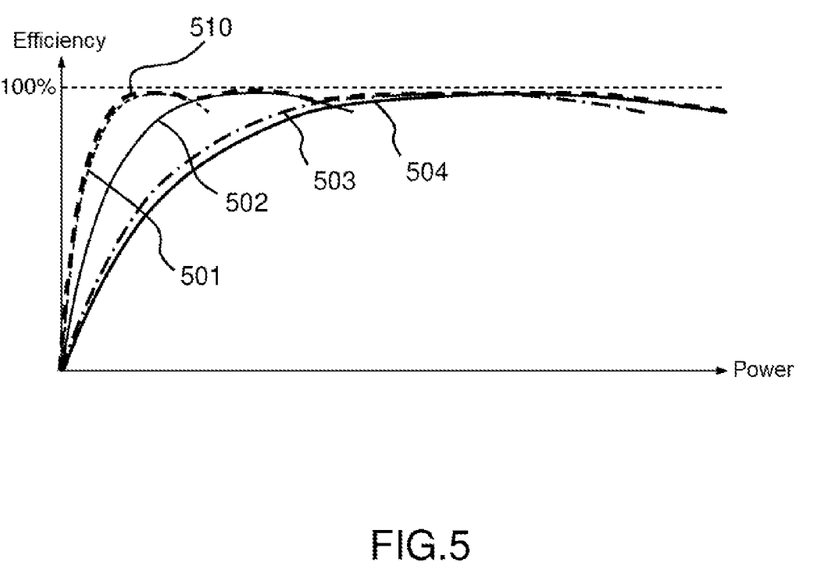

FIG. 5 gives an example of efficiencies that can be obtained as a function of the power required for a power train according to the invention.

The curve 501 illustrates the efficiency of the power train when a single coil is energized. The coil being supplied at a low voltage, the efficiency curve increases very rapidly with the power, then reaches a plateau corresponding to its maximum efficiency, before falling, the power train no longer able to provide the power required.

The curve 502 illustrates this same efficiency when two coils are energized. The slope of this curve is less steep than that of the curve 501 and reaches its maximum efficiency for higher levels of power before falling.

The tendency is the same for the following curves, the curves 503 and 504 representing the efficiency obtained as a function of the power when respectively $k_B-1$ and $k_B$ coils are energized.

The curve 510 shows the efficiency that can be obtained by judiciously activating/deactivating the coils over the whole of the power range. This efficiency is close to optimum regardless of the power required.

The invention thus also makes it possible to adapt the means implemented by the power train as a function of the power required, so as to always have the best possible efficiency, by activating or deactivating the coils. This turning off can be carried out very simply by the power inverter control unit, by keeping the transistors that it switches in a "high impedance" position (all of the transistors of the elementary inverter are open), which has the effect of turning off the electrical supply of the partial coils that the inverter supplies.

Finally, the invention is compatible with the majority of the improvements proposed for the power trains of the state of the art, such as for example that presented in patent EP 2 368 319 B1, in which the electric machine comprises several arrays of windings in a star structure, each of the arrays being supplied by an independent power inverter. The invention applied to this patent would consist of dividing each of the windings of each of the star-shaped arrays, as well as each of the inverters which supply them.

Figure 6A:
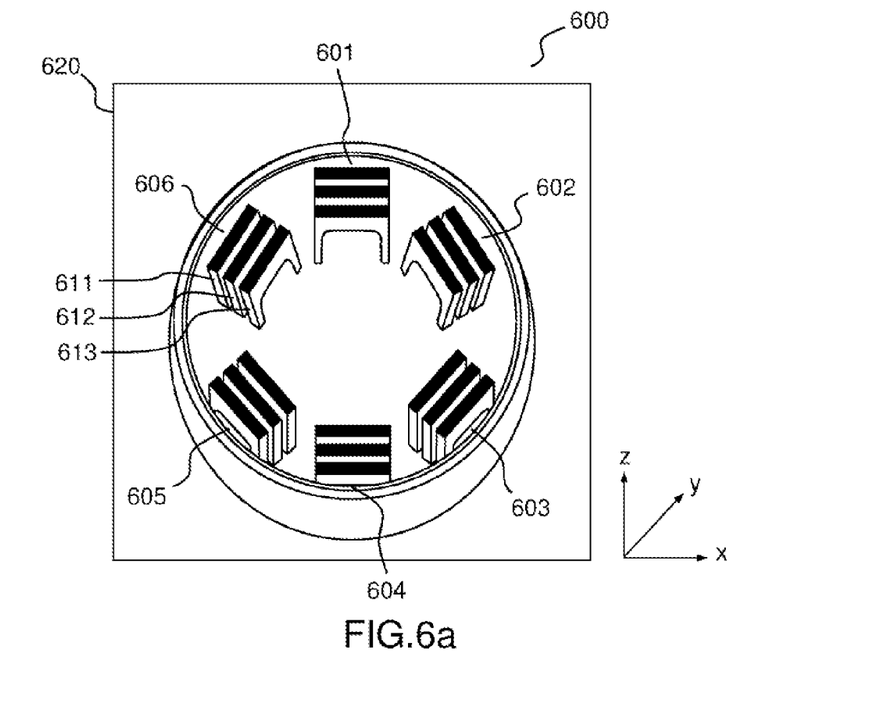
FIGS. 6a and 6b illustrate an advantageous embodiment of the invention, in which the partial coils of the windings are produced from single U-shaped turns connected to an electric circuit.
Figure 6B:
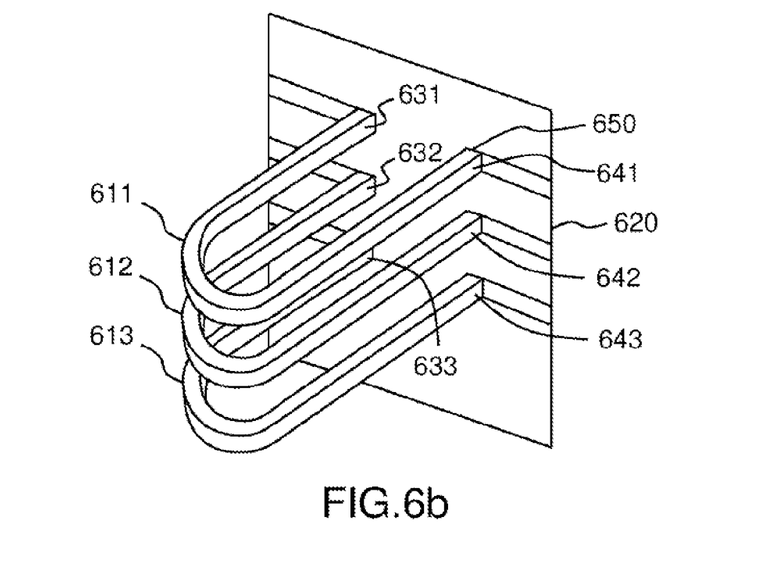

FIGS. 6a and 6b illustrate an advantageous embodiment of a power train according to the invention, provided by way of illustration, in which the partial coils are produced from single U-shaped turns connected to an electric circuit. In this embodiment, the coils are advantageously produced using conductors of large cross-section, such as for example flat conductors.

The larger the diameter of the conductive elements used, the more complex the production of the coiling of turns of a winding. Thus, manufacturers of electric machines favour the use of a large number of turns of a circular conductor of small cross-section rather than a single turn of a conductor of larger cross-section that can take the form of a conductor of rectangular cross-section (flat). However, such conductors offer a much greater packing density, and thus a smaller occupied surface for an identical thickness of copper, two adjacent circular turns of fine conductor necessarily leaving an empty space between them. In addition, the proportion of insulator with respect to the surface of copper is much lower. But the malleability of conductors of small cross-section (for example 0.5 mm$^2$) means that they are generally favoured with respect to conductors of a larger cross-section (for example 5 mm$^2$). This is even more true for flat conductors, the cross-section of which is in the shape of a rectangular parallelepiped with rounded edges. For an equivalent surface of copper, this type of conductor is more suitable for electric machines than a circular conductor as its width is greater than its thickness, but its winding in the form of consecutive turns proves particularly complex.

Now, the coilings of the windings of an electric machine are generally rectangular in shape, and it is known that the magnetic field induced by such windings originates in large part from portions situated in the magnetic circuit (long sides) and very little at the heads of the coils (short sides). By dividing the windings and the power inverters, the invention lends itself particularly well to the use of conductors of large cross-section as it does not necessarily require that they are shaped in successive coilings since the number of turns envisaged is small. To this end, the invention proposes to use U-shaped conductors, that can be flat conductors, and consider each U-shaped turn as being one of the partial coils of the invention. The ends of the Us forming the turns thus correspond to the terminals of the partial coils which compose a winding, and are suitable for being connected to a power inverter.

Advantageously, the ends of each turn are mechanically and electrically connected to a printed circuit board, or electric circuit. According to the embodiment, the ends of the U-shaped turns can be either soldered or stapled to the printed circuit board, and in contact with a conductive track of which it is composed. The tracks of the printed circuit board make it possible to convey the supply signal between the power inverter and the turn. According to another embodiment, the printed circuit board to which the turns are connected also comprise the power electronics necessary in order to implement the power conversion function generating the multiphase signals.

FIG. 6a illustrates this embodiment. In the example, the electric machine 600 is a multiphase machine comprising six windings 601 to 606. If we consider for example the winding 606, it is divided into three partial coils 611, 612 and 613, associated with one and the same phase of the inverter. These partial coils are constituted by a single turn of a U-shaped conductor of significant thickness, stapled or soldered mechanically and electrically by the ends of the U to a printed circuit board 620. The printed circuit board conveys the signal supplying the turns and can advantageously contain the power electronics necessary in order to transform a direct-current supply into multiphase alternating currents.

FIG. 6b a is representation in perspective view of one of the coils of the electric machine. In the example, the winding 606 is still under consideration. This winding is thus constituted by three U-shaped turns numbered 611, 612 and 613. These turns are shaped or not around an element of the casing (not shown) of the electric machine, which makes it possible, as with the printed circuit board, to hold them in position. The two ends (631 and 641, 632 and 642, 633 and 643) of each of these turns are connected to a track of the printed circuit board 620. The junction 650 between the turns and the printed circuit board can be produced by stapling, soldering, bonding, or any other means making it possible to mechanically and electrically connect these elements.

As shown in FIG. 6b, the turns are spaced apart from one another, but when arranged in an electric machine this spacing is advantageously reduced as far as possible.

The electric machine shown in FIGS. 6a and 6b thus has a packing density greater than the electric machines according to the state of the art. In addition, the layers of insulation separating the different turns are thinner the lower the voltage at the terminals thereof, thus also improving the packing density.

In summary, the invention proposes, rather than using multiphase electric machines the windings of which are supplied by high-voltage signals, to divide the windings into several partial coils, and to supply each of these partial coils by lower-voltage signals. The partial coils composing the resulting electric machine can be connected to low-voltage power inverters placed in parallel, which, for an equivalent delivered power, has numerous advantages:

Compatibility with the existing electric machines, subject to modification of the windings only, each partial coil composing the winding thus having to have independent terminals;

Improving the resistance to ageing of the electric machine, by reduction of the switched voltages, as well as its reliability, as the operation of the electric machine is not compromised in the case of the failure of one or several of the coils;

Improving the rate of occupancy of the windings, due to the reduction in the thickness of the insulators and/or the production of the partial coils from conductors with a large cross-section, such as flat conductors.

Reducing parasitic currents associated with the capacitive couplings between the conductors and the magnetic circuit of the machine, by connecting power inverters at one and the same reference potential;

Risk-free handling of elements making up the power train, subject to the parallelization of the items of equipment being such that the coils can be supplied at low voltages;

Using new transistor technologies for the production of the power inverters, with the aim of improving the efficiencies of the inverters and reducing the surface area required;

Possibility of subdividing the power inverter, and thus integrating it as closely as possible with the electric machine, thus improving the efficiencies (reducing the length of the tracks or the conductors connecting the electric machine to the power inverter), the heat management, the space occupied and the electromagnetic emissions;

Adjusting the power delivered by each of the batteries, making it possible to better take account of and manage the ageing thereof;

Managing the dividing of power by adjusting the number of coils supplied, which makes it possible to obtain the optimum efficiency of the power train regardless of the speed of the electric machine, and to protect the components of the chain of conversion.

The invention claimed is:

1. Electric machine, of the type comprising
a rotor and
a stator, the stator containing at least one winding made from coilings of insulated conductive material, each winding being associated with a phase of the electric machine,
wherein each winding comprises a plurality of coils supplied independently.

2. The electric machine according to claim 1, wherein the coils of one and the same winding are associated with one and the same phase of the electric machine.

3. The electric machine according to claim 2, wherein the coils of one and the same winding have a substantially equivalent number of turns.

4. The electric machine according to claim 2, wherein the windings each comprise one and the same number of coils supplied independently.

5. The electric machine according to claim 2, wherein the coils are composed of a single U-shaped conductive element, the ends of which are mechanically and electrically connected to a printed circuit board by means of which they are supplied.

6. An electric power train, comprising:
the electric machine according to claim 2;
a plurality of power inverters configured in order to generate AC supply signals associated with the different phases of the electric machine; and
a plurality of DC supply sources, each DC supply source being associated with a distinct power inverter, the coils of one and the same winding being supplied by power signals associated with one and the same phase generated by distinct power inverters.

7. The electric machine according to claim 1, wherein the coils of one and the same winding have a substantially equivalent number of turns.

8. The electric machine according to claim 7, wherein the windings each comprise one and the same number of coils supplied independently.

9. The electric machine according to claim 7, wherein the coils are composed of a single U-shaped conductive element, the ends of which are mechanically and electrically connected to a printed circuit board by means of which they are supplied.

10. An electric power train, comprising:
the electric machine according to claim 7;
a plurality of power inverters configured in order to generate AC supply signals associated with the different phases of the electric machine; and
a plurality of DC supply sources, each DC supply source being associated with a distinct power inverter, the coils of one and the same winding being supplied by power signals associated with one and the same phase generated by distinct power inverters.

11. The electric machine according to claim 1, wherein the windings each comprise one and the same number of coils supplied independently.

12. The electric machine according to claim 11, wherein the coils are composed of a single U-shaped conductive element, the ends of which are mechanically and electrically connected to a printed circuit board by means of which they are supplied.

13. The electric machine according to claim 1, wherein the coils are composed of a single U-shaped conductive element, the ends of which are mechanically and electrically connected to a printed circuit board by means of which they are supplied.

14. An electric power train, comprising:
the electric machine according to claim 13;
a plurality of power inverters configured in order to generate AC supply signals associated with the different phases of the electric machine; and
a plurality of DC supply sources, each DC supply source being associated with a distinct power inverter, the coils of one and the same winding being supplied by power signals associated with one and the same phase generated by distinct power inverters.

15. The electric power train according to claim 14, wherein the power inverters are produced on said printed circuit board.

16. The electric power train according to claim 14, wherein the power inverters are produced based on transistors of the MOSFET or GaN FET type.

17. The electric power train according to claim 14, wherein the power inverters are connected to a common electric potential.

18. The electric power train according to claim 14, wherein the power sources deliver a low-voltage signal.

19. The electric power train according to claim 14, wherein the power inverters are capable of turning off the electrical supply of the coils of the electric machine as a function of a required power.

20. An electric power train, comprising:
the electric machine according to claim 1;
a plurality of power inverters configured in order to generate AC supply signals associated with the different phases of the electric machine; and
a plurality of DC supply sources, each DC supply source being associated with a distinct power inverter, the coils of one and the same winding being supplied by power signals associated with one and the same phase generated by distinct power inverters.

* * * * *